United States Patent [19]
Holness

[11] Patent Number: 5,483,473
[45] Date of Patent: Jan. 9, 1996

[54] WAVEFORM GENERATOR AND METHOD WHICH OBTAINS A WAVE-FORM USING A CALCULATOR

[75] Inventor: Peter J. Holness, British Aerospace Defence Limited, Dynamics Division, Six Hills Way, Stevenage, Hertfordshire, Great Britain, SG1 2DA

[73] Assignee: Peter J. Holness, Hertford, England

[21] Appl. No.: 257,425

[22] Filed: Jun. 8, 1994

Related U.S. Application Data

[63] Continuation of Ser. No. 869,006, Apr. 16, 1992, abandoned.

[30] Foreign Application Priority Data

Apr. 19, 1991 [GB] United Kingdom .................. 9108467

[51] Int. Cl.$^6$ ...................................................... G06F 1/02
[52] U.S. Cl. ................................................................ 364/718
[58] Field of Search .................................... 364/718, 721, 364/735; 84/604

[56] References Cited

U.S. PATENT DOCUMENTS

| | | | |
|---|---|---|---|
| 3,789,203 | 1/1974 | Catherall et al. | 364/735 |
| 3,922,536 | 11/1975 | Hampel et al. | 364/718 |
| 3,962,573 | 6/1976 | Staley | 364/718 |
| 4,164,022 | 8/1979 | Rattlingourd et al. | 364/729 |
| 4,536,853 | 8/1985 | Kawamoto et al. | 364/718 |
| 4,710,891 | 1/1987 | Debus, Jr. et al. | 364/718 |
| 4,899,302 | 2/1990 | Nakayama | 364/729 |
| 5,060,181 | 10/1991 | Matsuoka | 364/718 |
| 5,068,816 | 11/1991 | Noetzel | 364/718 |

FOREIGN PATENT DOCUMENTS

WO8604702 8/1986 United Kingdom .

OTHER PUBLICATIONS

Kai Hwang et al, "Evaluating Elementary Functions with Chebyshev Polynomials on Pipeline Nets", Proceeding of the 8th Symposium on Computer Arithmetic, The Computer Society of the IEEE, 19, May 1987, Como, Italy pp. 121–128.

David Quong "Floating Point Microporcessor Implements High-Speed Math Functions", EDN Electrical Design News, vol. 31, No. 3, Feb. 1986, pp. 143–150.

C. Gyles, "800 ms/s Arbitrary Function Generator", Proceeding of the IEEE Instrumentation and Measurement Technology Conference, IEEE Press, 25 Apr. 1989, pp. 238–242.

Knowlton Miller, "Stimulus Function Generation for Até", IEEE Intercon Conference Record, vol. 1, 1975 pp. 1–5.

"Frei Programmierbarer Wellenform–Generator", Und–Oder– Nor Steuerungstechnik, vol. 24, No. 3, Mar. 1991 pp. 26–27.

L. Brodeur, "Advanced Techiques for True Arbitrary Waveform Synthesis", Wescon Proceedings, vol. 29, Nov. 1985, pp. 1–4.

J. Yvergniaux, "Series de Fourier Calcul Litteral et par Logiciel" Electronique Applications, No. 58 Feb. 1988, pp. 53–59.

*Primary Examiner*—Tan V. Mai
*Attorney, Agent, or Firm*—Cushman, Darby & Cushman

[57] ABSTRACT

Apparatus for generating waveforms that uses a calculator operable to generate a succession of output values which include solutions to a stored generator equation. In one embodiment the generator equation has the inverse of a trigonometric function as its argument. By combining mathematical functions to form different generator equations, a vast number of waveform shapes can be generated. The invention has applications in waveform synthesis for musical instruments, modulators, adaptive control systems, etc.

12 Claims, 11 Drawing Sheets

$$y = P_S\left[\frac{3\pi}{4}\sin\theta\right]$$

Fig. 9

$$y = P_T\left(\frac{3\pi}{4}\sin\theta\right)$$

$y = A(\text{sgn}\cos Bx \, \text{sgn}\cos B(x-t)) + p: A=0.25, B=5, p=1, t=0.125664.$

Fig. 12.

$y = \frac{1}{2}(\text{sgn}(\theta+1) - \text{sgn}(\theta-1))$

Fig. 13.

TRIGGER FUNCTION (APERIODIC)

Fig.14. TRIGGER FUNCTION T(t) (PERIODIC)

$y = e^{-k \, arc.cos(cos \theta)}$

FOR K=1000

Fig.15. LINEAR FM CHIRP

Fig.16. PARABOLIC FM CHIRP

PORTMANTEAU MINUS 1 FOURIER TERM

$y = P_c(x) + \text{sgn}.\cos x$

Fig.23.

$y = \frac{1}{2}\left[\text{sgn}(\sin 5x + 1) \cdot P_S(x) + \text{sgn}(\sin x)\right]$ Fig.24. $\quad y = \frac{\pi}{2} + P_s(x) - P_c(x)$ $$y = \tfrac{1}{2} \sin x \left[ 1 + \operatorname{sgn}\left(-\tfrac{1}{2} - \sin x\right) \right] - \tfrac{1}{4}\left[ 1 + \operatorname{sgn}\left(\sin x + \tfrac{1}{2}\right) \right]$$

Fig.25.

$$y = \tfrac{1}{2}\sin x \left(1 + \operatorname{sgn}\left(\tfrac{1}{2} - \sin x\right)\right) + \tfrac{1}{4}\left(1 + \operatorname{sgn}\left(\sin x - \tfrac{1}{2}\right)\right)$$

Fig.26.

Fig.27. $y = P_S(x) + \operatorname{sgn} \cdot \sin x$

Fig.28. $y = P_S(x) + \operatorname{sgn} \cos x$

WAVEFORM GENERATOR AND METHOD WHICH OBTAINS A WAVE-FORM USING A CALCULATOR

This is a continuation of application No. 07/869,006, filed on Apr. 16, 1992, which was abandoned.

BACKGROUND OF THE INVENTION

1. Field of the Invention

This invention relates to methods and apparatus for generating waveforms.

2. Description of the Related Art

There are many known techniques currently employed for generating waveforms, One technique is that of frequency synthesis which may involve the direct or indirect generation of a sine wave at a required frequency from a reference derived from a crystal oscillator, Direct frequency synthesis employs multiplication, mixer and divider circuits, whereas indirect synthesis employs phase-locked loop techniques. Both methods are therefore somewhat complicated to realize. Alternatively, digital forms of frequency synthesis obviate the need for complicated analogue circuitry but require large digital memories, A reference clock frequency is also required for this method in which a number representing the phase change per clock period is shifted into an accumulator on each clock cycle. The accumulator's output is an approximation of a linear phase versus time function which is then converted to analogue form by a digital to analogue converter (DAC), The reader is referred to "Frequency Synthesis by Phase Lock" by W. F, Egan (J. Wiley 1981) for detailed descriptions of synthesiser circuitry.

Other less complicated yet less precise and stable waveform generator circuits are described in many standard electronic text books. For example, a square and triangular wave oscillator can be simply realized using a two-operational amplifier circuit.

In a further example, an integrated circuit including a counter generates square waves which can be converted to an approximate sine wave by passing the square-wave signal through a fifth order band-pass filter.

Some dedicated circuits employ digital Fourier techniques, i.e. a digital expander expands a square wave into a variety of digital forms. These are summed to give a staircase approximation to the desired sine wave output, which is smoothed by a low-pass filter.

SUMMARY OF THE INVENTION

The present invention aims to provide a method and apparatus for waveform generation which has none of the inherent complication of a synthesis method yet does not sacrifice precision or stability in order to achieve simplicity.

The invention has arisen as a result of a discovery by the inventor, that discovery relating to the behaviour of computers and calculators particularly concerning the calculation of trigonometric values.

To assist the understanding of the invention, a resume of the discovery and the definition of a new set of trigonometric functions will now be given with reference to FIGS. 1 to 6 of the drawings.

Computations performed on, for example, hand-held calculators, personal computers, main-frame computers, which involve trigonometric functions acted upon by their own inverses yield surprising results.

For example, if the calculation arc sin (sin 89°) is performed on a calculator, the answer will be 89°. However, arc sin (sin 91°) will also be displayed as 89°. Arc sin (sin 135°) will be displayed as 45° and arc sin (sin 180°) will be displayed as 0, i.e. arc sin (sin $\theta$) is not always equal to $\theta$.

The same phenomenon occurs for the computations of arc cos (cos $\theta$) and arc tan (tan $\theta$) and the reader can readily verify this using a calculator.

Calculation of trigonometric functions can be done in a variety of ways, either by using look-up tables or by summing terms in a power series. Some methods and algorithms for computing inverse trigonometric functions are described in U.S. Pat. No. 4,899,302.

Figure 1:
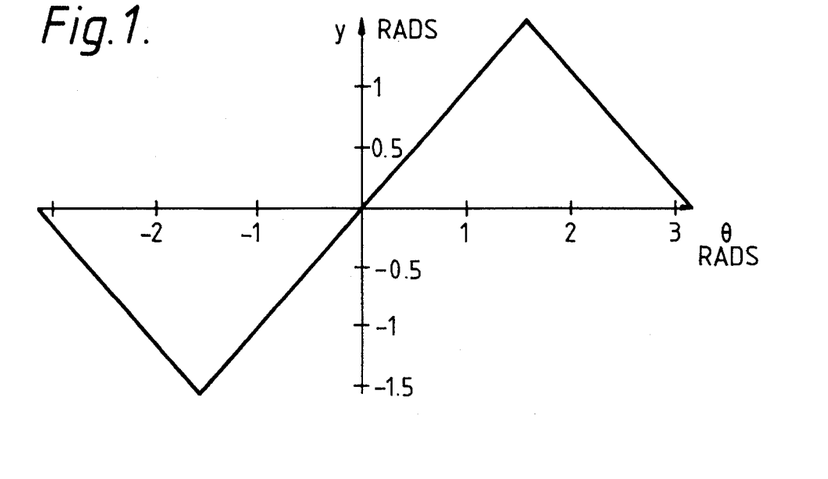
FIGS. 1–3 are examples of waveforms of Portmanteau functions of a first kind.
Figure 2:
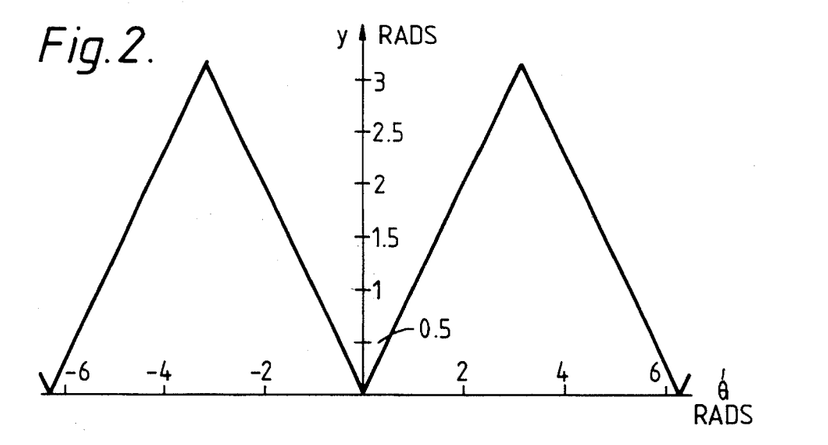
Figure 3:
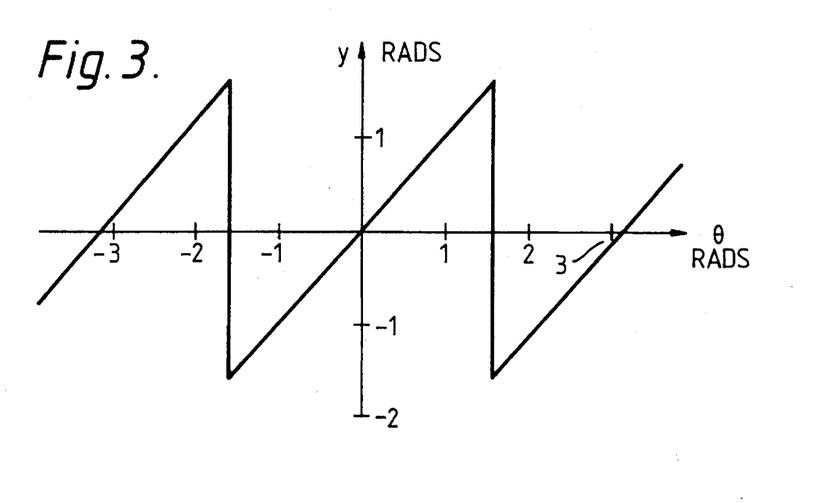

Inverse trigonometric functions are multivalued and in overcoming the ambiguity, computer algorithms produce the behaviour exemplified in FIGS. 1 to 3.

FIGS. 1, 2 and 3 show plots of an angle "$\theta$" versus a function "y" where in FIG. 1,
y=arc sin (sin $\theta$)
and $-\pi \leq \theta \leq \pi$
in FIG. 2,
y=arc cos (cos $\theta$)
and $-2\pi \leq \theta \leq 2\pi$
and in FIG. 3,
y=arc tan (tan $\theta$)
and $-\pi \leq \theta \leq \pi$ The functions on the ordinate axis of each plot (of FIGS. 1 to 3) are henceforth referred to as "Portmanteau" functions of the first kind and will be abbreviated to the form, $P_S(\theta)$, $P_C(\theta)$ and $P_T(\theta)$ where:
$P_S(\theta)$≡Parcsine $\theta$≡arcsin (sin $\theta$)
$P_C(\theta)$≡Parcosine $\theta$≡arccos (cos $\theta$)
$P_T(\theta)$≡Parctangent $\theta$≡arctan (tan $\theta$)

Portmanteau functions of the first kind have an argument which is an angle (in radians or degrees). They convert an angle to an angle.

As can be seen from FIG. 1, $P_s(\theta)$ is an odd, bipolar, triangular periodic function. Note also that:
$P_S(\theta)=P_S(\theta+2\pi n)$ where n is an integer.

FIG. 2 shows that $P_C(\theta)$ is an even, unipolar, triangular periodic function. It will be noted that:

$$P_C(\Theta) = P_C(\theta + 2\pi n) \text{ and that}$$
$$P_C(\Theta) = P_S(\Theta - \pi/2) + \pi/2$$

FIG. 3 shows that $P_T(\theta)$ is an odd, bipolar ramp, periodic function with discontinuities at $n\pi/2$, where n is an odd integer. It has been observed that not all calculating machines deal with arctan (tan 90°) in the same way: some will register an error, whereas others will display 90°. Note that:

$P_T(\theta)=P_T(\theta+\pi n)$.

The inventor has found that most, if not all calculating machines will exhibit the behaviour illustrated in FIGS. 1, 2 and 3.

The invention exploits that behaviour by arranging (in some embodiments) for Portmanteau functions to be used in waveform generating apparatus to be described below.

Figure 4:
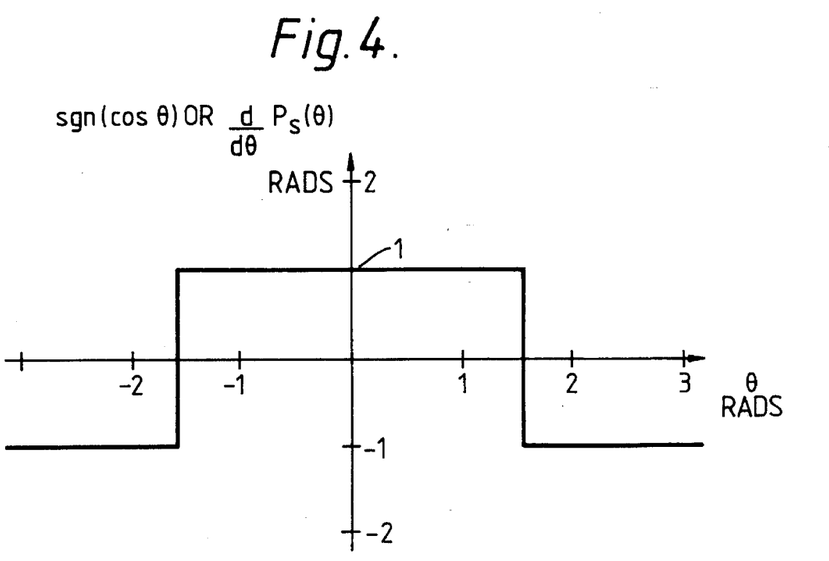
FIG. 4 is an example of a waveform of a derivative of a Portmanteau function of the first kind.

Derivatives of Portmanteau functions of the first kind will also be shown to have uses in waveform generation. In FIG. 4, $$\Theta \, v \, \frac{dP_S}{d\theta} \, (\Theta)$$

is plotted.
Note that:

$$\frac{dP_S}{d\theta} (\Theta) \equiv \frac{\cos \Theta}{\sqrt{\cos^2 \Theta}} \equiv \frac{\cos \Theta}{|\cos \Theta|}$$

The above expression $$\frac{dP_S}{d\theta} (\Theta)$$

is identical with sgn (cos θ),
where sgn x is +1 for positive values of x,
−1 for negative values of x
0 for x=0
A computer for calculating $$\frac{dP_S}{d\theta} (\Theta) \text{ or sgn } (\cos \Theta)$$

would produce the waveform of FIG. 4 for values of θ ranging from −π to +π. This waveform is a square wave of amplitude equal to 1.

Figure 5:
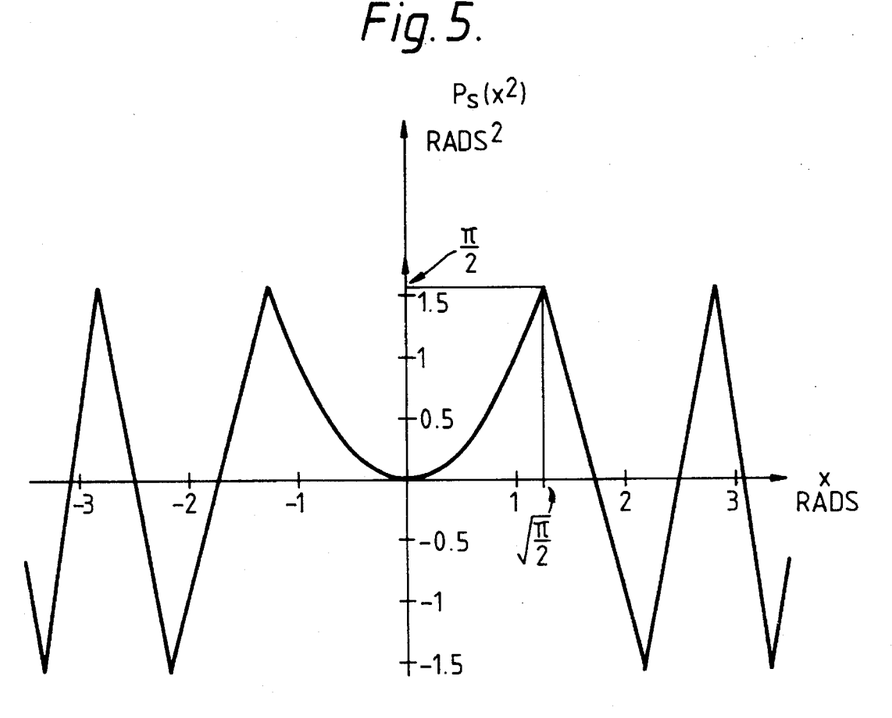
FIG. 5 is an example of a waveform of a Portmanteau function of a second kind.

Further functions, useful in assisting understanding of the invention will now be discussed with reference to FIG. 5 and 6.

Portmanteau functions of the second kind may be written in the following general terms:
$P_S[f(x)] \equiv \text{arc sin } [\sin(f(x))]$
$P_C[f(x)] \equiv \text{arc cos } [\cos(f(x))]$
$P_T[f(x)] \equiv \text{arc tan } [\tan(f(x))]$ where f(x) is any arbitrary function of x, and not necessarily a trigonometric function. FIG. 5 is a plot of x v $P_S(x^2)$. The central parabola is centred on the origin and behaves in a similar way to a plot of y=x², but the y value cannot go beyond π/2. This limit is reached at x=$\sqrt{\pi/2}$.

Portmanteau functions of the third kind are functions having a "split" argument by interposing a variable 'A' in a Portmanteau function as follows.
eg arc sin [A sin (sin θ)]
arc cos [A cos (sin θ)]
arc tan [A tan (sin θ)]
or arc sin [A sin θ]
arc cos [A cos θ]
arc tan [A tan θ]
where A can be any number.

Figure 6:
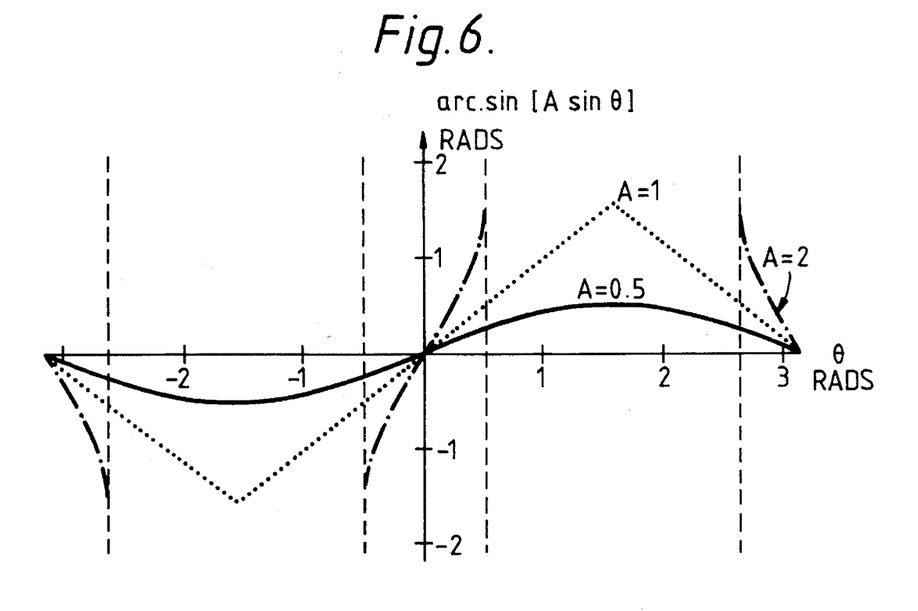
FIG. 6 is an example of a waveform at a Portmanteau function of a third kind.

FIG. 6 shows an example of the behavior of a Portmanteau function of the third kind as the value A is varied from 0.5, to 1, to 2. It can be seen from the Figure that sinusoids and triangular waveforms can be generated using this function.

A waveform generating apparatus according to this invention includes:

calculator means, operable to receive a set of input values which form an argument of a generator equation and to create a sequence of output values each comprising the calculated result of the generator equation;

and means for supplying the output values in succession to define successive segments of a waveform.

The apparatus could be realized using digital or analogue circuitry.

If the output values are in digital form, then the means for supplying output values in succession could be a DAC, clocked at a desired rate.

The generator equation could be stored in a memory, to which the calculator means has access.

The set of input values could also be stored in a memory and clocked into the calculator means at a desired rate.

The generator equation may have the form $y = \text{sgn}(\cos x)$ for example as previously described herein with reference to FIG. 4. Thus, the waveform generator embodied in this way would generate a square wave, by clocking into the calculating means, successive values of x between say −π and +π radians. Repeating this sequence would produce a continuous waveform.

In another example, the generator equation could be one of the Portmanteau functions previously described.

Alternatively, combinations of Portmanteau functions and other functions are envisaged, such as, for example, $$y = \left( \frac{1}{2} + \text{sgn } x \right) e^{-x} \times P_C(x)$$

Fourier terms may also be combined with Portmanteau functions, for example, the generator equation could have the form $$y = P_S(x) - \sin x + \frac{1}{9} \sin 3x.$$

It will be appreciated that a vast number of waveforms can be created using apparatus in accordance with the invention. The hardware required to realise the invention is minimal and uncomplicated.

A calculating machine, pre-programmed to calculate the desired function and interfaced with a DAC are the basic constituents of the apparatus. All commonly used algorithms for calculating inverse trigonometric functions may be employed by the calculator means for generating the Portmanteau functions.

Although a calculator with keyboard and a DAC are convenient modules for demonstrating the invention, the method lends itself to incorporation in dedicated integrated circuits (or ASICs). Such integrated circuits could find uses in all manner of applications, eg waveform generators for electronic musical instruments, modulators, pulse (timebase) generators, waveform generators for adaptive control systems, etc.

BRIEF DESCRIPTION OF THE DRAWINGS

Some embodiments of the invention will now be described by way of example only with reference to the Figures in which.

DETAILED DESCRIPTION OF THE PRESENTLY PREFERRED EMBODIMENT

Figure 7:
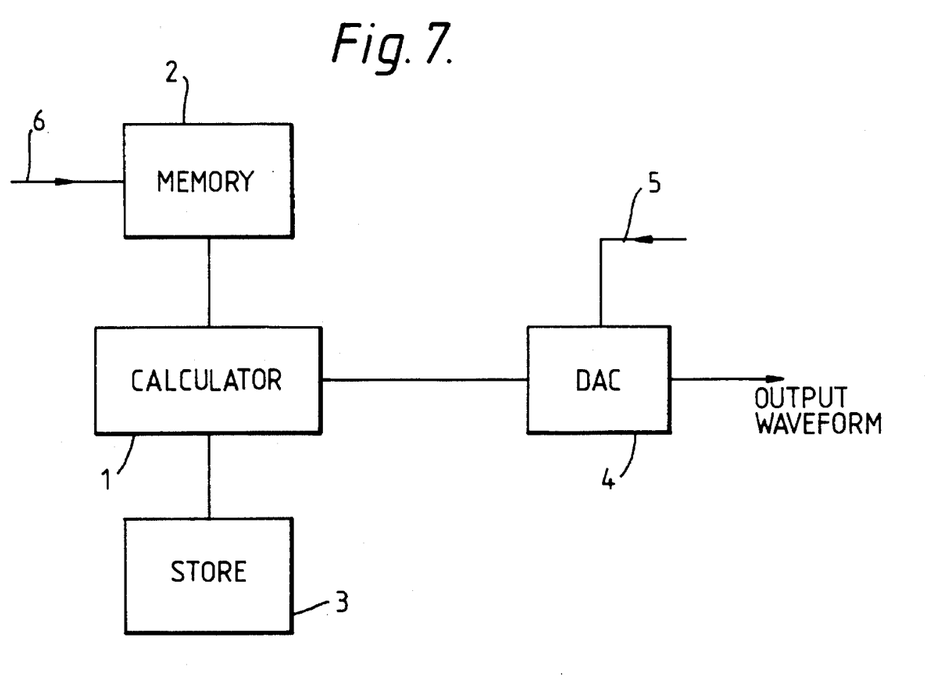
FIG. 7 is a block diagram of apparatus in accordance with a first embodiment of the invention.

In FIG. 7 a calculator 1 has inputs from a memory 2 and a store 3. The calculator has an output connected to a DAC 4. The DAC has a clock input 5 whose rate may be varied. The memory 2 has stored therein a plurality of generator equations which are separately addressable via an address line 6. The store 3 contains discrete values of a parameter forming an argument of a generator equation appearing on the output of the memory 2.

In a first example, the generator equation $$y = P_S \left[ \frac{3\pi}{4} \sin \Theta \right]$$

is selected and output from the memory 2 to the calculator 1.

The calculator 1 is programmed with the necessary algorithms to calculate successive values of y for a multiplicity of values of $\Theta$ lying between $-\pi$ and $+\pi$ and repeat this calculation as many times as desired. The discrete values of $\Theta$ are held in the store 3 and clocked into the calculator 1 in succession.

Each successive output value of y (in digital form) is latched into the DAC 4. The DAC 4 makes the conversion to analogue form and clocks out analogue data at a rate which is controlled by the clock input 5. Thus the frequency of the resulting waveform can be selected by modifying the clock rate on the clock input 5. A greater number of $\Theta$ values between its limits will give a smoother waveform than a lesser number.

Alternatively, the clock rate of the DAC 4 may be fixed at a constant value and the frequency of the output waveform varied by changing the value of the argument of the generator equation as appropriate.

A combination of the two alternatives is also possible.

Figure 8:
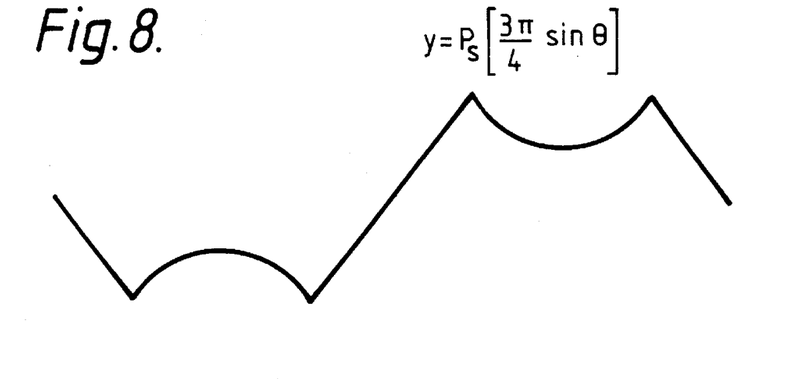
FIGS. 8 to 18 show examples of waveforms which are capable of being generated by the apparatus of FIG. 7.

FIG. 8 shows the type of waveform which can be generated using the function $$y = P_S \left[ \frac{3\pi}{4} \sin \Theta \right].$$

Figure 9:
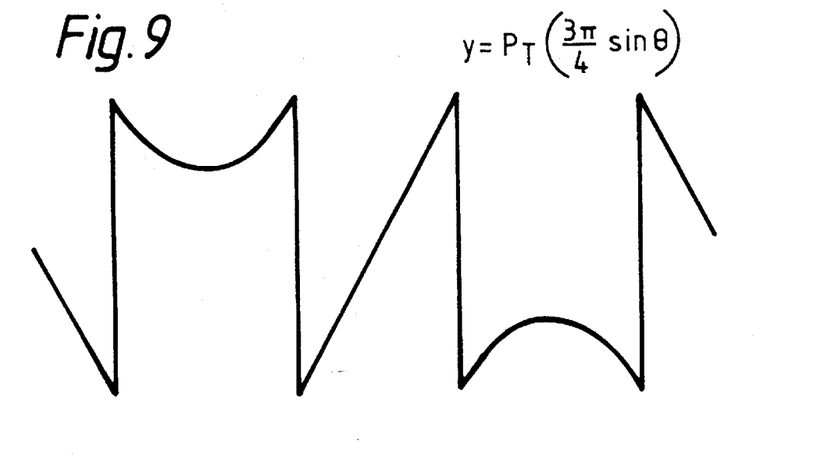

FIG. 9 shows the waveform generated for the function $$y = P_T \left( \frac{3\pi}{4} \times \sin \Theta \right)$$

The versatility of the apparatus of FIG. 7 will now be appreciated. Further examples reveal how Portmanteau functions can be combined with other mathematical functions to yield useful waveforms.

Figure 10:
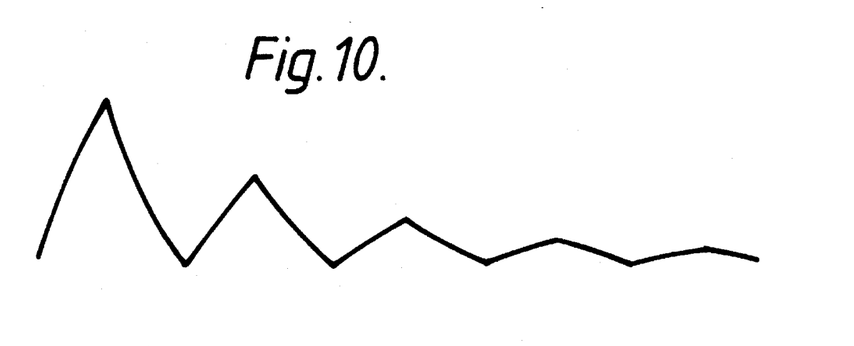

FIG. 10 shows the transient, decaying waveform obtainable for the function:

$$y = \left( \frac{1}{2} + \text{sgn}\,\Theta \right) \times e^{-\Theta} \times P_C(\Theta)$$

Using combinations of products, sums or differences of first derivatives of Portmanteau functions, almost any periodic waveform can be constructed. Suitable co-efficients can produce any amplitude, mark-space ratio, DC offset or polarity.

Figure 11:
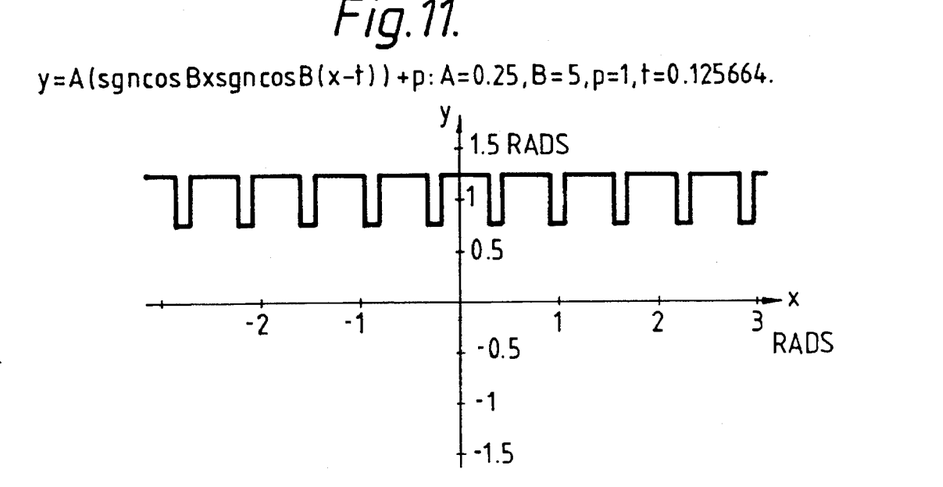

The rectangular pulse waveform of FIG. 11 can be generated by using a function of the form:

$$y = A\,sgn.(cos\,Bx).sgn[cos\,B(x-t)+P]$$

The embodiments thus far described have related to the generation of periodic waveforms. By applying the appropriate generator equation to the calculator 1, the apparatus is capable of generating most, if not all waveforms capable of being synthesised by known Fourier methods.

Considering singularity functions, there are two conventional ways of dealing with them:
(i) By "piecewise continuity"
(ii) By Fourier synthesis The first way is not ideal, being little more than a description: "The function has this value from there to there and another value from there somewhere else . . . etc".

The second way involves addition of a series of trigonometric terms or the evaluation of an integral. Approximation errors will be present due to the finite number of terms used or the finite range of integration. (Truncation errors).

Fourier analysis is a convenient way of producing a set of orthogonal functions for mapping between two domains. eg time and frequency etc.

Portmanteau functions offer an alternative method of waveform synthesis without truncation errors. In addition they offer a means for developing a waveform synthesis algebra. Note however that no algebraic method could be expected to produce values at the edge of a zero risetime pulse. For example, a more reasonable objective would be to develop formulae which describe the waveforms, at all points except the singularities.

We would expect the formulae to describe, to generate and to become suitably indeterminate at the singularities. Because of the far sightedness of computer language authors, there is no shortage of methods of dealing with indeterminacies.

Part of a waveform synthesis method has already been described. Portmanteau functions of the first and second kinds can be used to generate a variety of trapezoids, triangles, ramps, rectified sine waves and other shapes with and without discontinuities. Square waves can be synthesised using derivatives of Portmanteau functions.

The apparatus of FIG. 7 is also capable of generating a periodic singularity functions and frequency-modulated waveforms.

A universal waveform synthesis capability requires the generation of "one shot" or non periodic signals. Almost any arbitrary signal can be built from combinations of periodic and non periodic signals.

A very important tool for constructing non periodic signals is the Heaviside function or unit step. The piecewise definition is:

$$u(t_-)=0(-\infty<t<o)$$

$$u(t_+)=1(0<t<+\infty)$$

Existing mathematics texts still use this piecewise description or their Fourier and Laplace equivalents.

An alternative form is given below:

$$u(t) = \frac{1}{2}\left(1 + \frac{t}{|t|}\right)$$

The function describes, generates and becomes indeterminate at t=0. Different software exhibits a variety of responses to singularities, poles etc. It is a simple matter to build an "error trap" for t=0. The "signum" function (SGN) is a more elegant solution.

SGN(−N)=−1
SGN(+N)=+1 Where N is any real number
SGN(O)=0

The step generator function can be re-written thus:

$$U(t) = \frac{1}{2}(1 + SGNt)$$

This alternative form returns values of 0 in the left half plane, +1 in the right half plane and +½ at t=0. In effect, the function accomplishes a "normalised" unit step, originally proposed by Heaviside as a way of dealing with singularity at zero. Heaviside's piecewise description for a normalised unit step was:

$$(1) = \begin{cases} 0 \text{ for } t < 0 \\ 1/2 \text{ for } t = 0 \\ 1 \text{ for } t > 0 \end{cases}$$

The SGN function is incorporated into most computer languages. Its presence is a testament to the skillful way in which the problems of singularity were apparently anticipated by the language authors.

Figure 12:
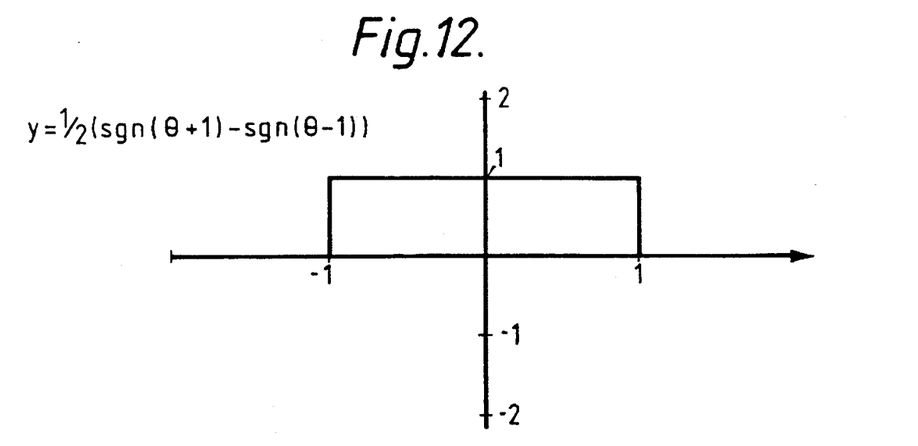

Applying the step generator function will permit almost any aperiodic signal to be synthesised. As an example, an aperiodic symmetric pulse may be generated by the function:

$$y = \frac{1}{2}[\text{sgn}(\Theta + 1) - \text{sgn}(\Theta - 1)]$$

(see FIG. 12).

As with the periodic generators, the aperiodic generators can be adjusted. Suitable coefficients allow time shifting, asymmetry and different amplitudes etc.

In a further example, consider the use of a delta function.

The delta function is normally given a piecewise description and a integral definition:

$$\delta(t) = \begin{cases} \infty \text{ at } t = 0 \\ 0 \text{ for } t \neq 0 \end{cases}$$

$$\int_{-\infty}^{+\infty} \delta(t)dt = 1$$

Another definition is:

$$\delta(t) = \frac{d}{dt}\{u(t)\}$$

There are analytical and practical difficulties connected with developing generator equations for δ(t). A more useful function can be defined and implemented by the calculator 1. This is the "trigger function":

$$T(t) = \begin{cases} 1 \text{ at } t = 0 \\ 0 \text{ for } t \neq 0 \end{cases}$$

The function can be implemented in several forms, aperiodic and periodic.

Figure 13:
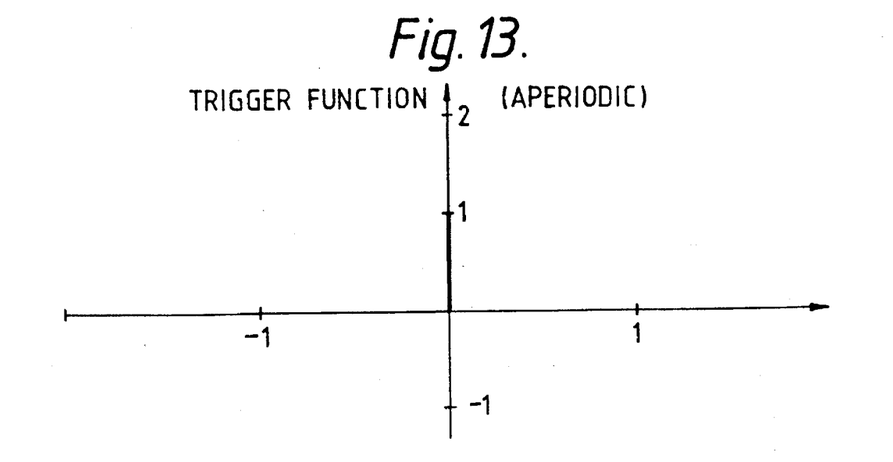

One method of implementing an aperiodic trigger function is to shrink the width of a pulse. FIG. 13 shows a plot of the function $$y = \frac{1}{2}[\text{sgn}(\Theta + t) - \text{sgn}(\Theta - t)] \text{ for } t = 0.005.$$

Figure 14:
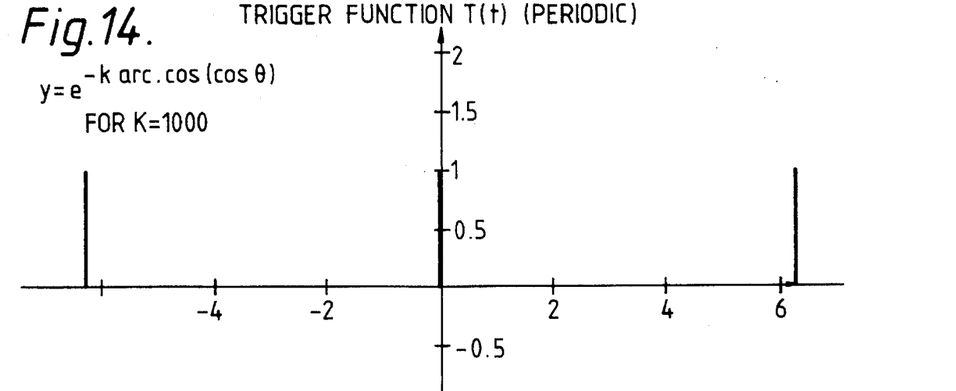

A periodic trigger function can be made to trigger at the zeroes of the Parcosine function at intervals of $2\pi$ by using the function $$y = e^{-k \, arc.cos(\cos\Theta)}$$

(See FIG. 14).

An arbitrary function eg $f(x)=x^n$ say, can be multiplied by a first kind Portmanteau. The combined result will be a periodic version of $x^{n+1}$ over a bounded range. The range of the combination will be determined by the amplitude and period of the Portmanteau. The period of the combination will be related to the period of the Portmanteau.

Figure 15:
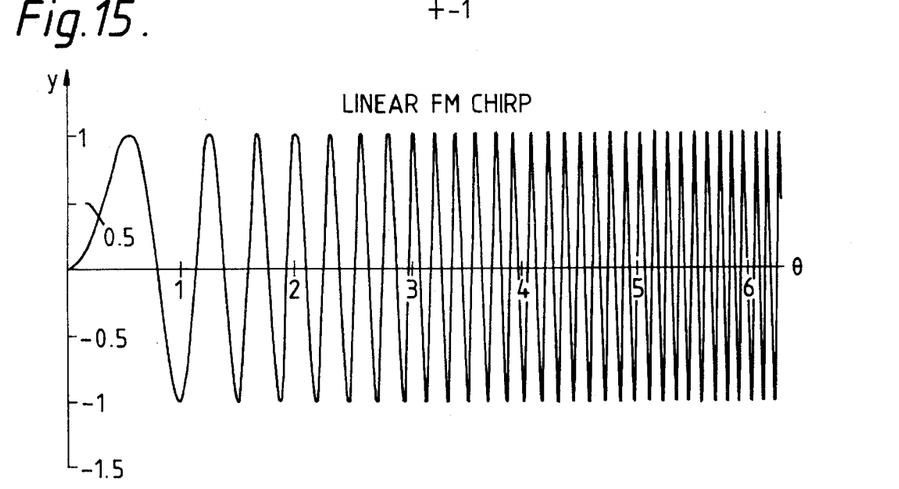
Figure 16:
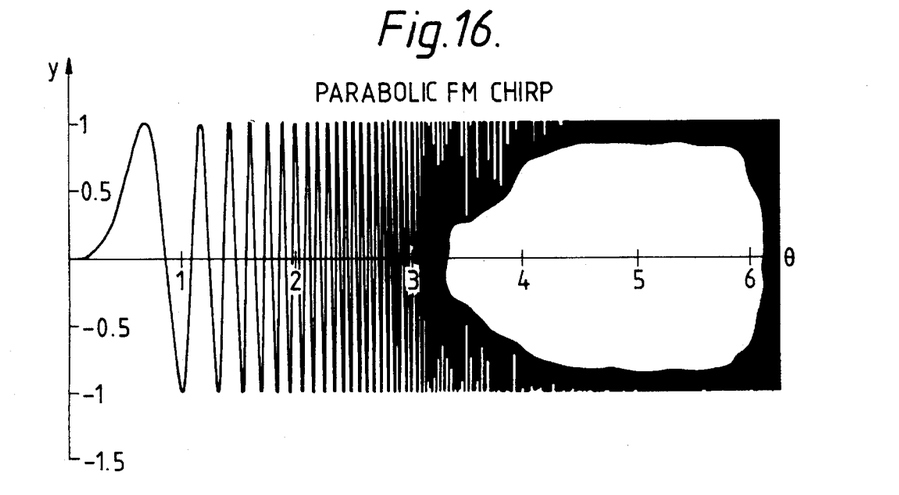

It has already been mentioned that the invention embodied by the apparatus of FIG. 7 can be used to generate frequency modulated waveforms. FIGS. 15 and 16 show two such examples. The generator equations solved by the calculator 1 in these cases are, respectively:

$$y = \sin[AP_c(B\Theta)]$$

and $$y = \sin[AP_c(B\Theta)\Theta^2]$$

where A and B are constants.

FIG. 15 shows a linear FM chirp waveform, and FIG. 16, a parabolic FM chirp waveform.

It is interesting to compare waveform synthesis by the method according to the invention with Fourier methods. For example, to synthesise a square wave, the function $$y = \frac{\pi}{4} \text{sgn}(\sin\Theta)$$

can be used.

An approximation to a squarewave can also be synthesised using Fourier components, eg the first six terms being:

$$y = \sin\Theta + \frac{1}{3}\sin 3\Theta + \frac{1}{5}\sin 5\Theta +$$

$$\frac{1}{7}\sin 7\Theta + \frac{1}{9}\sin 9\Theta + \frac{1}{11}\sin 11\Theta$$

Figure 17:
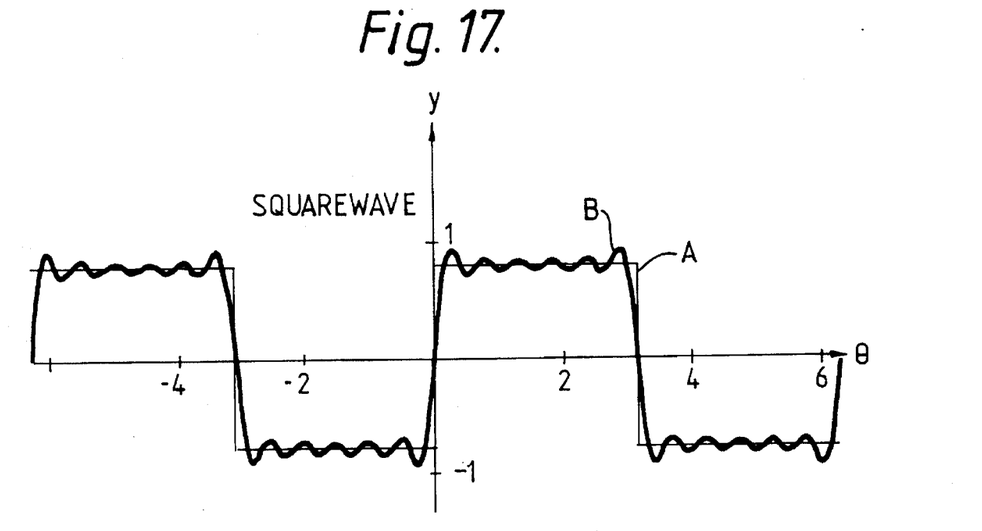

FIG. 17 compares the waveform obtained using the generator equation $$y = \frac{\pi}{4} \text{sgn} (\sin \Theta) \quad \text{(curve A)}$$

with the waveform obtained by summing the above Fourier terms (curve B). The distortion on curve B can be clearly seen whereas there is no distortion on curve A which shows a clean square wave free from ripple.

Figure 18:
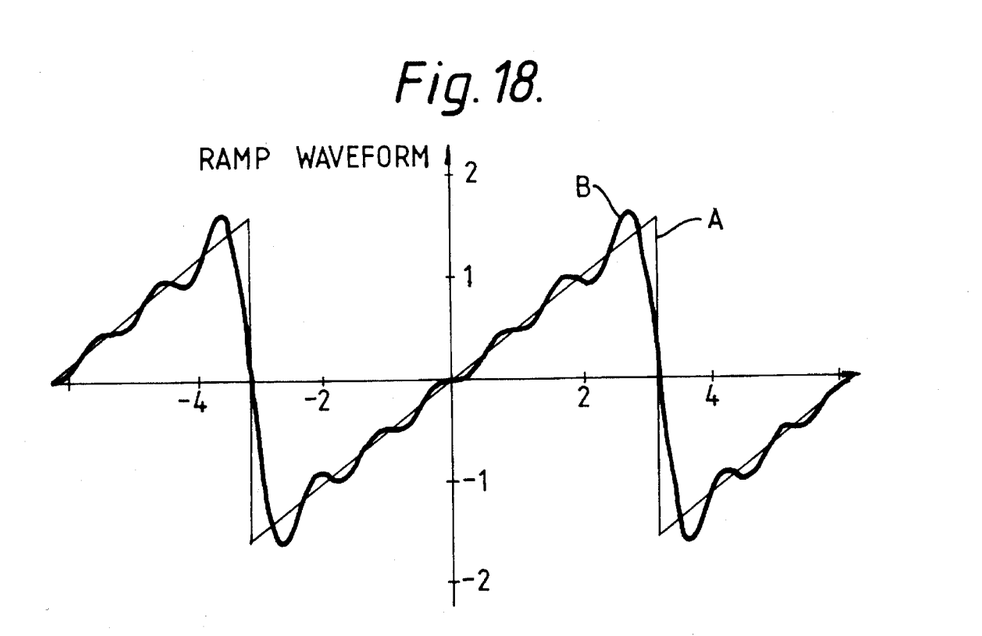

A similar comparison can be made in the case of a ramp waveform. In FIG. 18, curve A shows the waveform obtained using the generator equation $$y = P_7(\%)$$

Superimposed is curve B, which is the waveform obtained by summing the Fourier terms:

$$y = \sin \Theta - \frac{1}{2} \sin 2\Theta + \frac{1}{3} \sin 3\Theta -$$

$$\frac{1}{4} \sin 4\Theta + \frac{1}{5} \sin 5\Theta - \frac{1}{6} \sin 6\Theta$$

Again distortion can be seen on curve B.

Reducing distortion maybe done by adding more Fourier terms, but this adds to the total computation time which maybe a disadvantage in some applications.

In some applications it may be desirable to deliberately introduce some distortion into a waveform. This can be done using, for example, the second embodiment of FIG. 19. This embodiment is the same as that of FIG. 7 except for the addition of a further memory 7. In this memory 7 are stored a series of Fourier terms, which can be accessed by the calculator 1.

Figure 19:
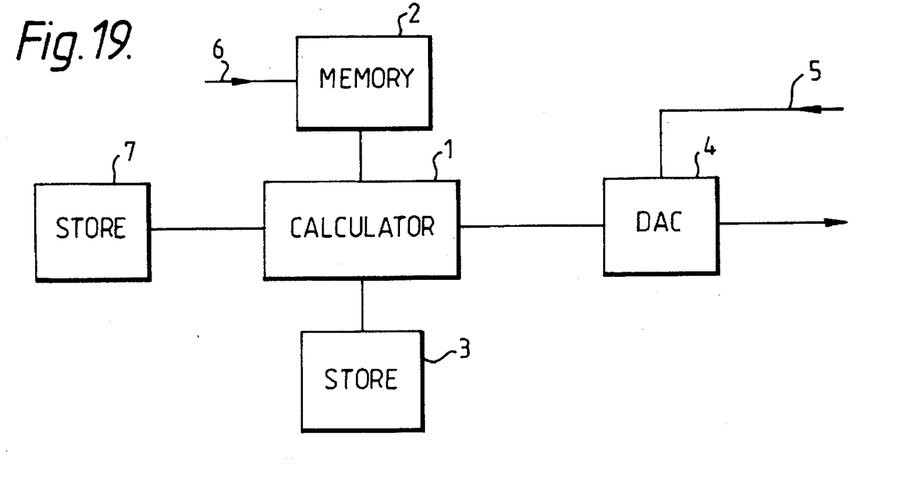
FIG. 19 is a block diagram of an apparatus in accordance with a second embodiment of the invention.

In operation, the calculator 1 computes successive values of the solution to the generator equation stored in the memory 2 (as performed by the first embodiment). However, before outputting these successive values to the DAC 4, it subtracts or adds (depending on how it has been pre-programmed) one or more of the Fourier terms stored in the store 7.

Figure 20:
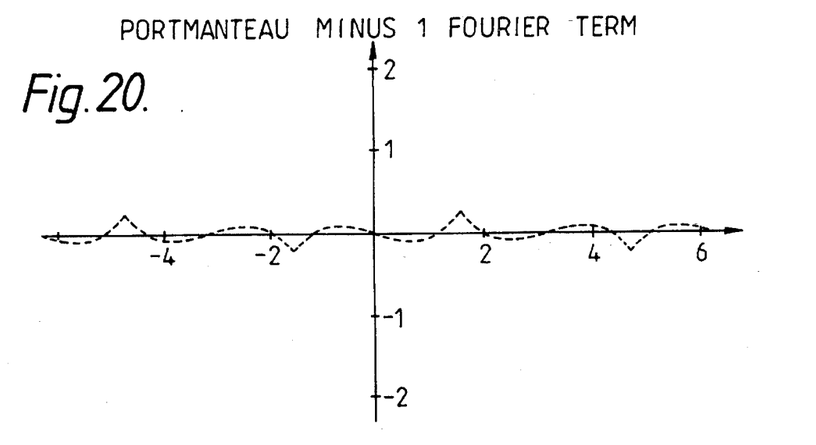
FIGS. 20 and 21 show examples of waveforms which are capable of being generated by the apparatus of FIG. 19.

As an example, FIG. 20 shows the waveform which can be obtained when the calculator 1 is arranged to solve the equation $$y = \frac{\pi}{4} P_S(x) - \sin x$$

for successive values of x. The Portmanteau term $$\frac{\pi}{4} P_S(x)$$

is stored in the memory 2 and the Fourier term—sin x is stored in the store 7.

A second example (FIG. 21) shows a distorted square wave. This can be formed by computing $$y = \frac{\pi}{4} \text{sgn} (\sin x) + \frac{1}{11} \sin 11x$$

Figure 21:
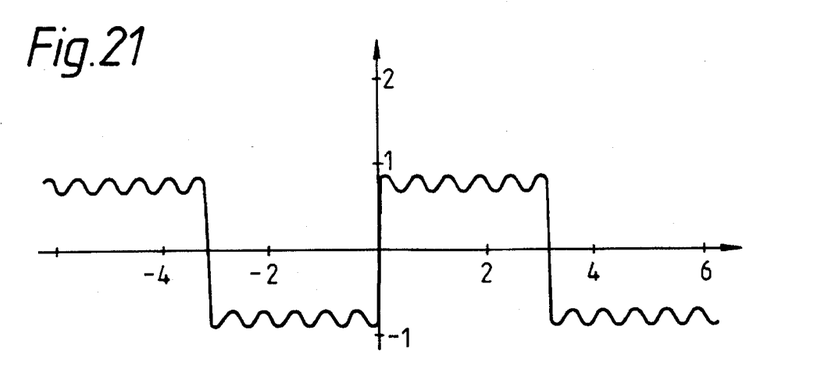
Figure 22:
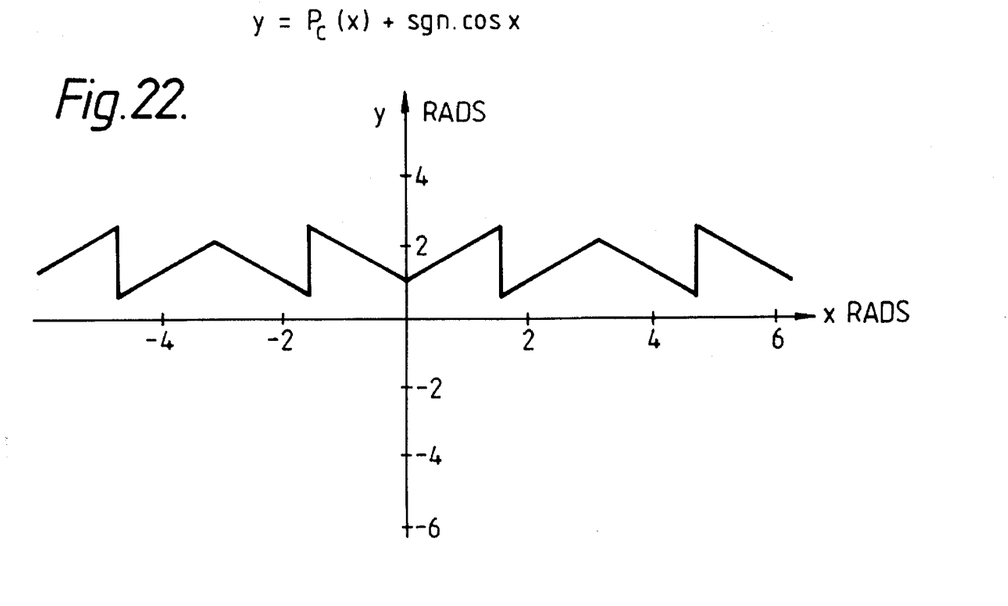
FIGS. 22 to 28 show further examples of waveforms which can be generated using methods in accordance with the invention.
Figure 23:
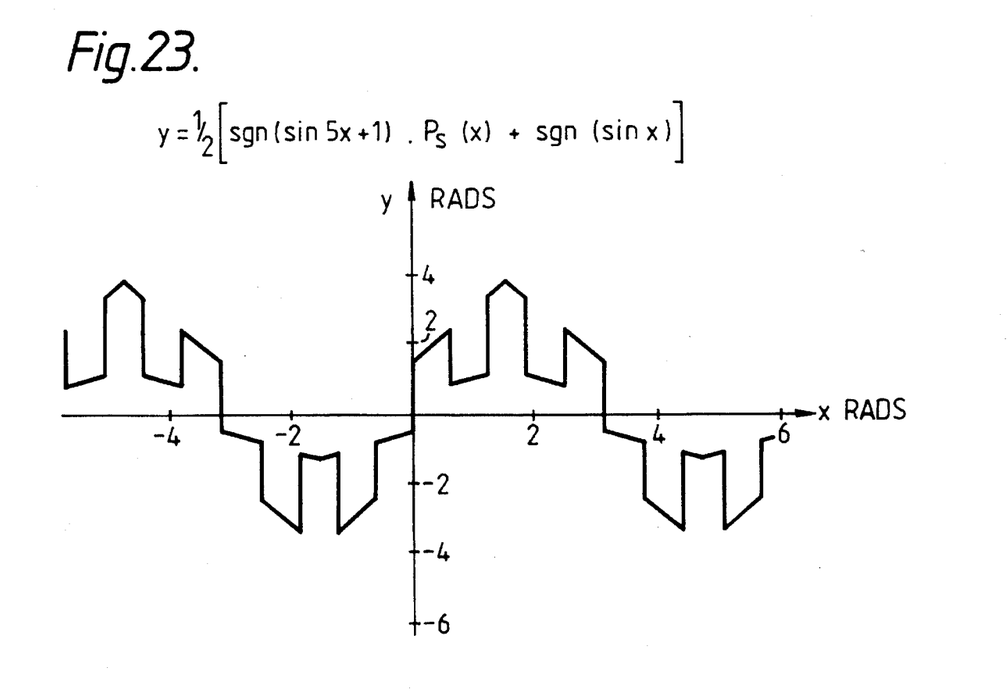
Figure 24:
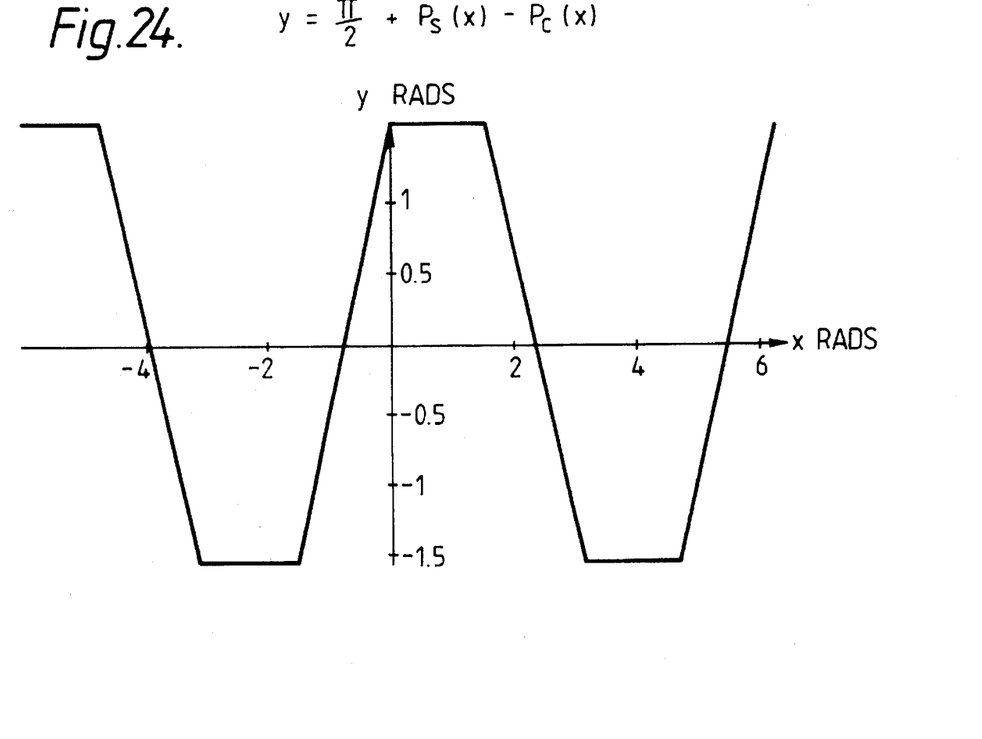
Figure 25:
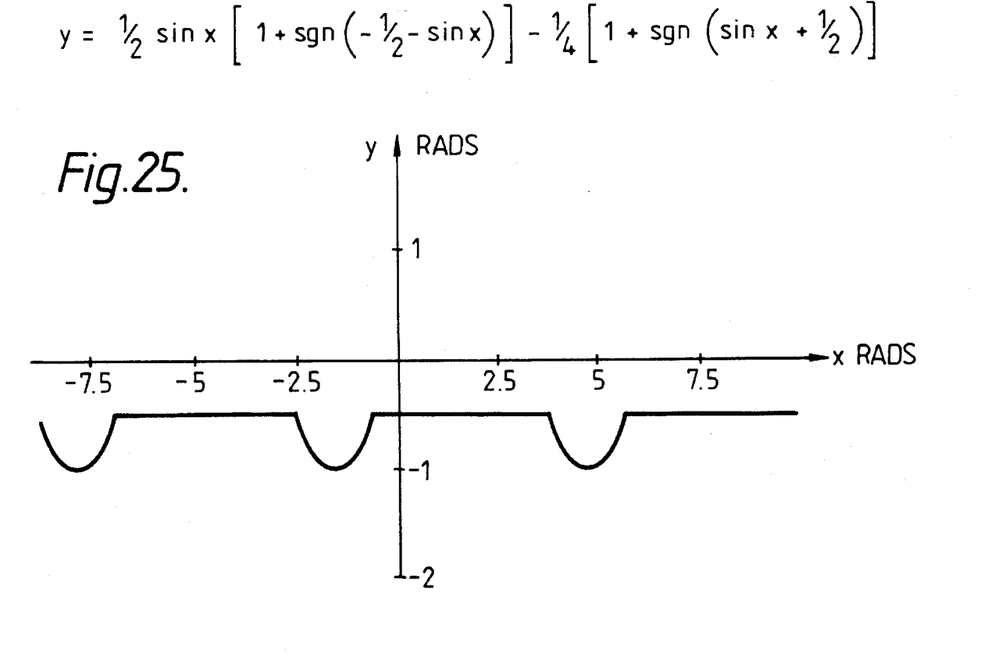
Figure 26:
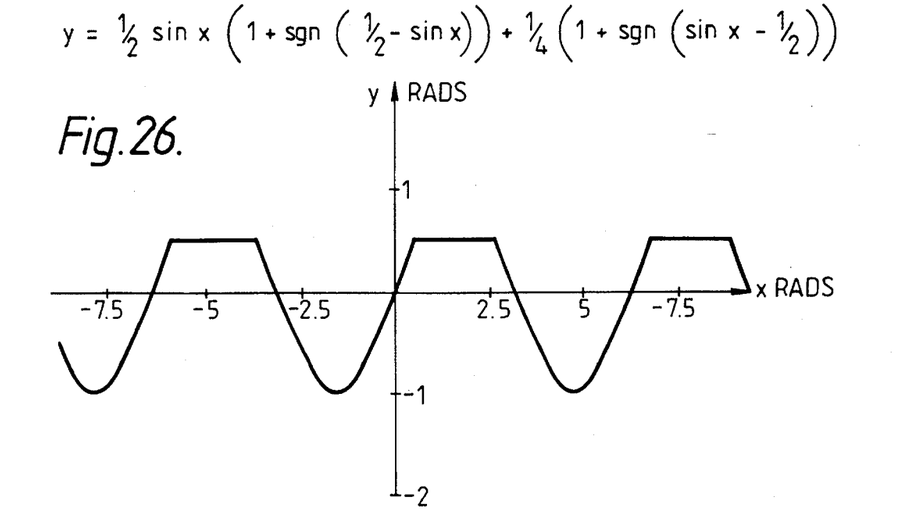
Figure 27:
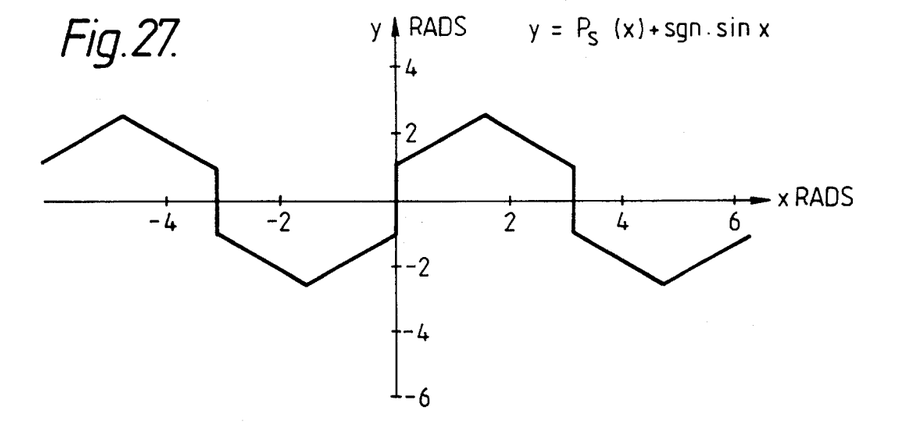
Figure 28:
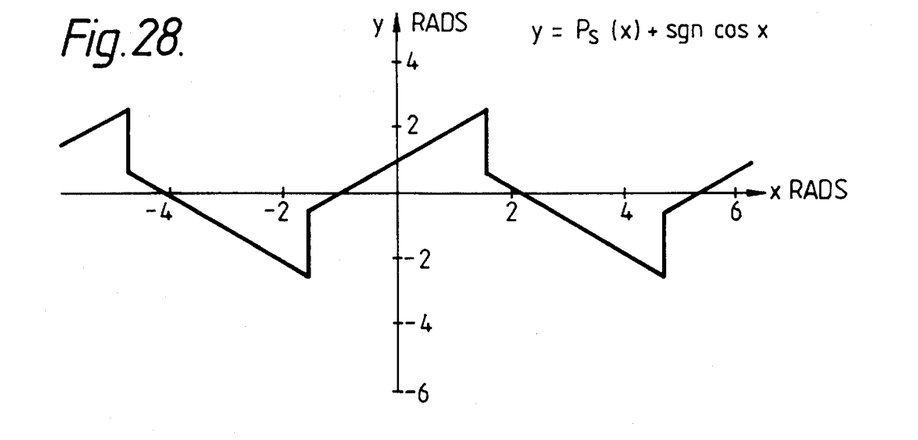

This treatment of the original generator equation (i.e. strengthening one of the harmonics of the square wave) produces a "ringing" distortion.

It will be appreciated that the number of distorted waveforms which can be produced by this method is vast, FIGS. 20 and 21 showing merely two typical examples of what can be achieved.

The remaining examples of FIGS. 22 to 28 show waveforms such as trapezoids and clipped sine-waves which can be generated by the methods of the invention hereinbefore described. These examples by no means define the limits of invention, but are included in order to illustrate its utility.

I claim:

1. Apparatus for generating waveforms, said apparatus comprising:

first memory means for storing a plurality of generator equations, said generator equations corresponding to Portmanteau functions;

second memory means for storing discrete values of a parameter defining an argument for said generator equations stored in said first memory means;

a processing means receiving at least one of said plurality of generator equations from said first memory means and receiving a sequence of said discrete values from said second memory means for generating a sequence of values corresponding to a calculated result of said at least one generator equation using said sequence of discrete values as said arguments therein; and means for providing said sequence of values in a succession so as define successive segments of a waveform.

2. An apparatus according to claim 1, wherein said processing means comprises:

a calculating means for obtaining a value corresponding to said calculated result of said at least one generator equation using one discrete value from said sequence of discrete values as said argument therein; and means for causing said calculating means to repeatedly obtain said value using additional discrete values from said sequence of discrete values thereby obtaining said sequence of values until all of said discrete values in said sequence of discrete values have been used as said argument in said at least one generator equation.

3. An apparatus for generating waveforms according to claim 1, wherein said means for providing said sequence of values in succession includes a digital-to-analog converter receiving said sequence of values.

4. An apparatus for generating waveforms according to claim 1, wherein said plurality of generator equations includes a term comprising an inverse of a trigonometric.

5. An apparatus for generating waveforms according to claim 4, further comprising a third memory means for storing a series of Fourier terms, wherein said processing means receives at least one of said series of Fourier terms and modifies said sequence of the values based on said one of said series of Fourier terms received from said third memory means and outputs said modified sequence of values to said means for providing said values in a succession.

6. An apparatus for generating waveforms according to claim 1, further comprising a third memory means for storing a series of Fourier terms, wherein said processing means receives at least one of said series of Fourier terms and modifies said sequence of values based on said one of said series of Fourier terms received from said third memory means and outputs said modified sequence of values to said means for providing said values in a succession.

7. Method for generating waveforms comprising the steps of:

storing, in a first memory, a plurality of generator equations, said generator equations corresponding to Portmanteau functions;

storing, in a second memory, discrete values of a parameter defining an argument for said generator equations stored in said first memory;

selecting at least one of said plurality of generator equations stored in said first memory based on a desired waveform to be generated;

selecting a sequence of said discrete values stored in said second memory based on a desired waveform to be generated;

providing at least one of said plurality of generator equations from said first memory and said sequence of discrete values from said second memory to a processing means;

generating, using said processing means, a sequence of values corresponding to a calculated result of said at least one generator equation using said sequence of discrete values as said arguments therein; and providing said values in a succession so as define successive segments of a waveform.

8. A method according to claim 7, wherein said generating step includes the steps of:

obtaining one of said successive values corresponding to said calculated result of said at least one generator equation using one of said discrete values from said sequence of discrete values as said argument therein; and repeating said obtaining step using additional discrete values from said sequence of discrete values, thereby obtaining said sequence of values, until all of said discrete values in said sequence of discrete values have been used as said argument in said at least one generator equation.

9. A method according to claim 7, wherein said step of providing said sequence of values in succession includes converting said sequence of values in a digital-to-analog converter.

10. A method according to claim 7, wherein said plurality of generator equations includes a term comprising an inverse of a trigonometric.

11. A method according to claim 7, further comprising a step of storing a series of Fourier terms, in a third memory, wherein said processing means modifies said sequence of the values based on one of said plurality of Fourier terms received from said third memory and outputs said modified sequence of values to said means for providing said values in a succession.

12. A method according to claim 1, further comprising a step of storing, in a third memory, a series of Fourier terms, wherein said processing means modifies said sequence of the values based on one of said plurality of Fourier terms received from said third memory and outputs said modified sequence of values to said means for providing said values in a succession.

* * * * *